United States Patent Office 3,283,579
Patented Nov. 8, 1966

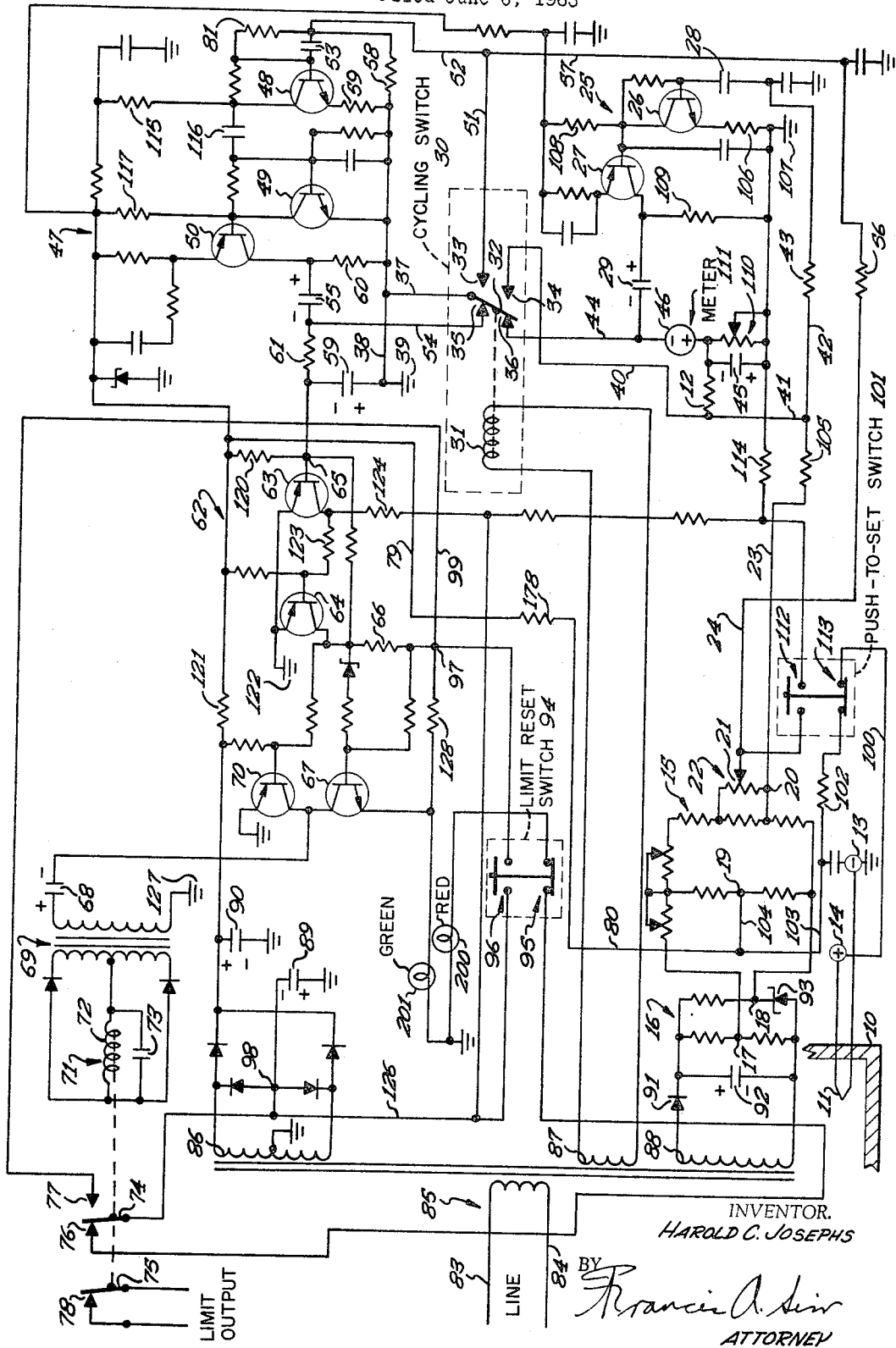

3,283,579
THERMOCOUPLE APPARATUS
Harold C. Josephs, Plymouth, Minn., assignor to Honeywell Inc., a corporation of Delaware
Filed June 6, 1963, Ser. No. 285,938
8 Claims. (Cl. 73—359)

This invention is concerned with an improved thermocouple apparatus and particularly with such an apparatus which utilizes a single thermocouple to provide continuous indication of the temperature to which a thermocouple sensing junction is subjected, high limit sensing of this temperature, and selective indication of the high limit temperature setting by means of a display on the indicator portion of my apparatus.

My invention resides in the use of a thermocouple whose output voltage is compared to the voltage of a single bridge circuit, wherein the bridge circuit is provided with a first fixed magnitude output voltage and a second variable magnitude output voltage. The first fixed magnitude output voltage is, in my preferred embodiment, connected in polarity aiding relationship to the thermocouple output voltage and is connected through cycling switch means to a temperature indication amplifier, the cycling switch means being effective to chop both the input and the output of the amplifier to produce a step function D.C. voltage at the input which is then amplified and converted back to a D.C. voltage at the output where a D.C. indication meter is energized to indicate the temperature to which the thermocouple sensing junction is exposed.

The thermocouple output voltage and the second variable magnitude output voltage of the bridge are connected in polarity opposing relationship, the magnitude of the second output voltage being variable to adjust the control point setting of the high limit portion of my apparatus.

The high limit portion of my apparatus utilizes a high limit amplifier whose input and output is chopped by a cycling switch means to convert the input D.C. voltage to a step function D.C. voltage and to then reconvert the voltage at the output of the amplifier to a D.C. voltage.

Specifically, the output of my high limit amplifier consists of a D.C. pulse output of one polarity or the other, depending upon the temperature of the thermocouple sensing junction above or below the high limit temperature which has been selected by the variable output voltage of the bridge.

I then provide a trigger amplifier, which may take the form of a Schmitt trigger, which is of a monostable type having a stable condition and an unstable condition to which it is triggered by the particular pulse output from the high limit amplifier which is of a polarity indicative of a temperature condition at the thermocouple which is below the high limit temperature. Thus, upon the temperature remaining at a condition below the high limit temperature, the trigger amplifier cycles continuously between its stable and its unstable state.

The output of the trigger amplifier is connected to an output means which responds only to continued cycling of the trigger amplifier. So long as the output means responds to this continued cycling, an output indicative of a high limit condition is not provided. Specifically, I provide a transformer having a relay connected in circuit with the secondary winding thereof such that the relay is continuously energized only upon the trigger amplifier continuously cycling between its two states of operation to energize the primary winding of this transformer.

As a safety feature, I provide biasing circuit means functioning to provide a fail safe input signal to the input of the high limit amplifier in the event that circuit component failures occur. The biasing circuit means is constructed and arranged to provide an input signal which simulates the presence of a high limit condition to thus indicate a high limit when circuit component failure occurs. Specifically, I provide two high impedance input signal circuits, one of which is associated with the thermocouple and the other of which is associated with the bridge circuit. Should a component failure occur in either the thermocouple or the bridge circuit, a fail safe input signal is fed to the input of the high limit amplifier to provide safe failure, that is failure indicating a high limit condition.

My invention will be apparent to those skilled in the art upon reference to the following specification, claims, and drawing, of which the single figure is a schematic representation of an embodiment of my invention.

Referring specifically to the single figure, reference numeral 10 designates a portion of the wall of an area in which a sensing junction 11 of a thermocouple is located to be subjected to the temperature within the area defined by wall 10. Sensing junction 11 is connected to a pair of thermocouple output terminals 13 and 14, terminal 13 being grounded. Terminals 13 and 14 are located at a position somewhat remote from sensing junction 11 and terminals 13 and 14 may constitute the reference junction of the thermocouple and is normally subjected to the ambient temperature surrounding the outer area of wall 10.

Reference numeral 15 identifies generally a bridge circuit whose energizing voltage is derived from a regulated source of D.C. voltage 16, having a negative output terminal at terminal 17 and a positive output terminal at terminal 18. As is well known, bridge circuit 15 may include temperature sensitive impedance elements to provide ambient temperature compensation for variations in ambient temperature to which the thermocouple reference junction (terminals 13 and 14) is subjected.

Bridge circuit 15 is in essence reference voltage means to which the output voltage of the thermocouple is compared. Bridge circuit 15 includes a first output which exists between terminals 19 and 20 and which can be considered to be a voltage rise from terminal 19 to terminal 20. A second output exists from terminal 19 to a movable tap 21 of a high limit temperature control setting potentiometer 22. The voltage from terminal 19 to movable tap 21 is a voltage drop.

As will be apparent, the output of the thermocouple-bridge circuit combination exists between ground potential, as represented by thermocouple terminal 13, and conductors 23 and 24. Furthermore, conductor 23 provides an output voltage to the temperature indicating portion of my apparatus whereas conductor 24 provides an output voltage to the high limit portion of my apparatus.

Reference numeral 25 identifies generally a temperature indication amplifier, biased as a Class A amplifier, having a pair of transistors 26 and 27. The input to indication amplifier 25 includes the input capacitor 28 and the output includes the output capacitor 29.

I provide a cycling switch 30 which includes an electrically energizable actuator 31 connected to control a movable switch blade 32 cooperating with stationary switch contacts 33, 34, 35 and 36. Switch blade 32 is connected, by means of conductors 37 and 38, to ground potential at 39. Switch contact 34 is connected to the input of indication amplifier 25 by means of conductors 40, 41 and 42, resistor 43 and capacitor 28. Switch contact 36 is connected to the output of amplifier 25 by means of a conductor 44 which is connected to capacitor 29.

Specifically, cycling switch means 30 is effective to chop the voltage at the input and at the output of amplifier 25 to allow both of the capacitors 28 and 29 to charge in the mode of operation in which the cycling switch 30 is shown in the single figure, and to allow discharge of both of these capacitors in the alternate mode of operation of the cycling switch. Furthermore, the discharging of output capacitor 29 is effective to charge a further capacitor 45, this capacitor constituting a portion of a feedback network, and to also energize a D.C. meter 46, meter 46 being calibrated to indicate the temperature to which sensing junction 11 is subjected. Meter 46 may also be used to indicate the high limit temperature to which tap 21 has been set, as will be apparent.

Reference numeral 47 designates generally a high limit amplifier including transistors 48, 49 and 50. These transistors are interconnected to provide Class A operation of the amplifier and to provide a 180 degree phase shift of the signal applied to the input of the amplifier.

The input and the output of amplifier 47 are again chopped by means of cycling switch 30. Stationary contact 33 is connected, by means of conductors 51 and 52 to an input capacitor 53 and an input resistor 58, whereas switch contact 35 is connected by means of a conductor 54 to an output capacitor 55.

As has been mentioned, conductor 24, which is connected to bridge tap 21, is the output of the thermocouple-bridge circuit combination which is used to sense a high limit condition. Conductor 24 is connected through a resistor 56 and a conductor 57 to conductor 52. With cycling switch 30 in the position shown, a circuit is completed from conductor 52 through input resistor 58, connected in parallel with input capacitor 53 and the base-to-emitter circuit of transistor 48 and a resistor 59, to ground terminal 39. Thus, capacitor 53 charges, and a voltage is developed across resistor 58, of a polarity depending upon the output voltage at conductor 24 being a voltage rise (indicative of the existence of a high limit condition) or a voltage drop (indicative of the absence of a high limit condition).

With cycling switch 30 in the position shown, output capacitor 55, and a further capacitor 59, are shorted through resistors 60 and 61 respectively. As will be apparent, capacitors 55, 59 and 53 are charged and discharged during alternate periods of operation of cycling switch 30. Specifically, while input capacitor 53 is charging (switch 32–35 closed), capacitor 55 is charging and capacitor 59 is discharging. Alternately, while capacitors 53 and 55 are discharging, capacitor 59 is charging. Such operation provides polarity discrimination to sense the polarity of the input voltage to the input of high limit amplifier 47.

Reference numeral 62 designates generally a monostable trigger circuit, in the form of a Schmitt trigger. This trigger circuit includes a transistor 63 which is biased normally to the nonconductive state and a transistor 64 which is biased normally to the conductive state. This is the stable condition of trigger circuit 62.

Trigger 62 responds only to a negative input at the base electrode of transistor 63, the input terminal being terminal 65. An input voltage of this polarity is effective to cause transistor 63 to switch to its unstable condition of operation wherein it is conductive. Thus, transistor 64, whose input electrodes are connected to the output electrodes of transistor 63, is rendered nonconductive.

The output of trigger 62 exists at resistor 66. The voltage developed across resistor 66 is applied to the input electrodes of a further transistor 67, this transistor 67 being effective, as will be apparent by further description of my invention, to charge a capacitor 68 connected to the primary winding of a transformer 69. A further transistor 70 is also connected in circuit with capacitor 68 and this further transistor is effective to discharge capacitor 68.

Thus, so long as Schmitt trigger 62 continues to cycle between its stable and unstable states of operation, capacitor 68 is cyclically charged and discharged, and the secondary winding of transformer 69 receives electrical energy. This electrical energy is effective to maintain an output relay 71 continuously energized. Relay 71 includes an actuating winding 72, shunted by a capacitor 73, and movable switch blades 74 and 75 cooperating with stationary contacts 76, 77 and 78.

In the disclosure of my single figure, I show relay 71 de-energized, as it is to indicate the presence of a high limit condition. During normal operation, relay 71 is continuously energized and switch blade 74 engages contact 77, while switch blade 75 is disengaged from contact 78. I have chosen to label the switch combination 75–78 as "Limit Output" to simplify the disclosure, it being recognized that this switch could be used in a variety of ways, including a simple alarm to be sounded upon the presence of a high limit condition.

As I have mentioned, I provide fail safe means which is effective upon malfunction of the thermocouple or malfunction of the thermocouple-bridge circuit combination. The first such means includes a high magnitude resistor 78 which is connected by means of a conductor 79 to a source of positive potential and is also connected by means of a conductor 80 to terminal 19 of bridge circuit 15. Open circuiting, for example burnout, of the thermocouple is effective to cause a positive voltage to be fed to terminal 19 of the bridge circuit to simulate a high limit condition upon such thermocouple failure.

A fail safe means of this general nature is provided by a high magnitude resistor 81 which is connected to a source of positive potential and is also connected to the input base electrode of transistor 48 to provide a positive voltage (a voltage rise) at the input of high limit amplifier 47 to simulate the presence of a high limit condition should portions of the input circuit malfunction, including the thermocouple, the bridge circuit, and the associated conductors and resistors which connect the input signal to the input of the high limit amplifier.

Referring more specifically to the construction of the preferred embodiment of my invention, operating voltage therefor is provided by a pair of power line conductors 83 and 84 which are connected to a source of alternating voltage, not shown. Conductors 83 and 84 are connected to the primary winding of a transformer 85 having secondary windings 86, 87 and 88.

Secondary winding 86 is effective, by means including interconnected rectifying elements, to charge capacitors 89 and 90, these capacitors constituting sources of D.C. supply voltage for circuit elements of the amplifying means.

Secondary winding 88, in combination with rectifying means 91, is effective to charge a capacitor 92 which is connected to impedance means including a Zener diode 93 to provide a regulated source of D.C. voltage at terminals 17 and 18. The impedance values of the interconnected impedance elements are such that terminal 17 is negative with respect to terminal 18.

Secondary winding 87 is connected directly to the electrically energizable actuator 31 of cycling switch 30 and maintains actuator 31 continuously energized to cause continuous cycling of the movable switch blade 32 between its two positions.

With the apparatus as shown in the single figure, output relay 71 is de-energized, this being the condition indicating the presence of a high limit condition. To reset relay 71 to a "no high limit" condition it is necessary to actuate a limit reset switch 94 to open its switch 95 and to close its switch 96.

The closing of switch 96 is effective to connect a terminal 97, associated with Schmitt trigger 62 and with transistors 67 and 70, to the negative terminal 98 of the D.C. power supply comprising capacitor 89. If it is assumed that at this time there is no high limit condition, Schmitt trigger 62 is cycling between its stable and unstable state and develops a cyclic voltage across load resistor 66. This cyclic voltage causes transistors 67 and 70 to cycle between conducting and nonconducting states to charge and discharge capacitor 68. As a result, relay 71 is energized to close its switch 74–77 and to open its switch 75–78. The closing of switch 74–77 completes a circuit from the above-mentioned terminal 97 through conductor 99 and through switch 77–74 to the above-mentioned terminal 98 of the power supply. Thus, this circuit is in parallel with the switch 96 of limit reset switch 94 and limit reset switch 94 can be released. The apparatus is now in the normal operating condition, functioning to indicate at meter 46 the temperature within the zone defined by wall 10 and with the high limit amplifier 47 and Schmitt trigger 62 effective to indicate the presence of a high limit temperature if such a condition should occur.

Referring to the temperature indication portion of my apparatus, the input circuit to indication amplifier 25 can be traced from ground through the voltage rise defined by thermocouple terminals 13 and 14, conductor 100, push-to-set switch 101, resistor 102, conductors 103 and 104, terminals 19 and 20 of bridge circuit 15, conductor 23, resistor 105, conductor 42, resistor 43, capacitor 28, base-to-emitter circuit of transistor 26, and resistor 106 to ground terminal 107.

As can be seen, the magnitude of signal current flowing in this circuit is determined by the total voltage rise formed by the addition of the voltage rise from thermocouple terminals 13 and 14 to the voltage rise from bridge terminal 19 to terminal 20. Since transistor 26 is biased Class A, an increased signal current flow (indicating an increase in temperature of sensing junction 11) results in an increased voltage developed across its load resistor 108. This in turn causes an increase in current flow through the output electrodes of transistor 27 and an increased voltage is developed across its load resistor 109. As the current through transistor 27 increases (indicative of the temperature rise at sensing junction 11) the upper terminal of resistor 109 becomes more positive. This changing voltage, moving in a positive direction, is effective to charge capacitor 29 through a circuit which can be traced from the upper terminal of resistor 109 through capacitor 29, conductor 44, switch 36–32, conductors 37 and 38, and ground connections 39 and 107 to the lower terminal of resistor 109. Thus, capacitor 29 is charged to a voltage level, and of a polarity as indicated, which is indicative of the magnitude of the temperature to which the sensing junction 11 is subjected. During the alternate cycle of cycling switch 30 capacitor 29 discharges through a circuit which can be traced from the right-hand positive terminal of this capacitor through resistor 109, potentiometer 110 in parallel with capacitor 45, and meter 46 to the negative terminal of capacitor 29. Capacitor 29, in discharging through the above-traced circuit, is effective to cause meter 111 to indicate the temperature of the sensing junction 11 and is also effective to charge feedback capacitor 45 as indicated.

Feedback capacitor 45 is connected as a form of degenerative feedback, its upper negative terminal being connected by means of resistor 112 and conductor 41 to the input circuit of indication amplifier 25.

A further mode of operation which can be achieved at meter 111 is to indicate the control point high limit temperature setting of movable tap 21 to which the high limit portion of my apparatus is set. To achieve this mode of operation, push-to-set switch 101 is actuated to close its switch 112 and to open its switch 113. The opening of switch 113 is effective to disconnect the thermocouple by opening conductor 100, whereas the closing of switch 112 is effective to connect tap 21 to ground potential through a resistor 114. The voltage present between tap 21 and terminal 20 of bridge network 15 consists of a voltage rise from tap 21 to terminal 20. Thus the negative tap 21 is connected to ground whereas the positive terminal 20 is connected to the input of amplifier 25. The magnitude of current which flows through resistor 109 (the amplifier output) is thus indicative of the setting of potentiometer tap 21. The more negative that this tap is made (by movement in an upward direction) with respect to terminal 20, the greater the current flow through resistor 109 and the higher the temperature reading which is indicated at meter 111. Thus, this reading at meter 111 can be observed while manually positioning tap 21 to a desired high limit temperature setting.

Considering now my limit control amplifier 47, the input circuit for this amplifier can be traced from grounded terminal 13 of the thermocouple through the voltage rise to thermocouple terminal 14, conductor 100, push-to-set switch 101, resistor 102, conductors 103 and 104, the voltage drop existing between bridge terminal 19 and movable tap 21, conductor 24, resistor 56, conductors 57 and 52, and resistor 58 to ground connection 39. The current which flows through resistor 58, by virtue of this circuit, is in effect driven by the voltage drop from terminal 19 to tap 21 so long as a below limit condition exists. As a result, the voltage developed across resistor 58 is such as to maintain the right-hand terminal of this resistor negative with respect to the left hand terminal.

When a high limit condition exists, the current flow through resistor 58 is driven by a voltage rise existing at thermocouple terminals 13 and 14 and the right-hand terminal of resistor 58 is then positive with respect to the lower terminal.

The voltage developed across resistor 58 can be considered to be an input signal to the base-to-emitter electrodes of transistor 48, driving the transistor through input capacitor 53 and through resistor 59. The output signal of transistor 48 is developed across its load resistor 115 and this signal is capacitance coupled, by virtue of capacitor 116, to the input electrodes of transistor 49. This coupling is such that a reduction in current flow through the output electrodes of transistor 48 is accompanied by an increasing current flow through the load resistor 117 of transistor 49. Transistor 50, whose input electrodes are connected directly to resistor 117, likewise experiences an increase in current flow through its output electrodes and thereby an increasing voltage is developed across load resistor 60.

The exact mode of operation of my amplifier 47 can be seen by considering switch blade 32 of cycling switch 30 in position to engage contact 35. In this half cycle of cycling switch 30 the following four conditions exist: (1) the input to transistor 48 is controlled by the potential level at conductor 52 as determined by the thermocouple output, (2) a voltage is developed across resistor 60, with the upper terminal positive, and of a magnitude indicative of the potential level at conductor 52, (3) capacitor 55 charges through switch 32–35, to the polarity indicated, and of a magnitude indicative of the voltage developed across resistor 60, and (4) capacitor 59 discharges through a short time constant circuit including resistor 61 and switch 32–35.

Upon cycling switch 30 moving to its alternate mode, or half cycle, of operation, blade 32 engages contact 33 to establish the right-hand terminal of resistor 58 at ground potential. A current, which I choose to call a reference current, now flows through resistor 60 as determined by the circuit constants, with the upper terminal of resistor 60 being a positive reference voltage. Switch 32–35 is now open and the voltage of capacitor 55, as charged during the previous half cycle, is now connected in series opposition to the reference voltage developed across resistor 60.

It will be remembered that the voltage of capacitor 55 is directly indicative of the potential level at conductor 52. If a below limit condition exists, the voltage of capacitor 55 is greater than the reference voltage. If an above limit condition exists, the voltage of capacitor 55 is smaller than the reference voltage. This can be seen by remembering that, (1) a below limit condition results in a negative voltage, or voltage drop, at conductor 52 with a high output current, higher than the reference current, through resistor 60 to thus charge capacitor 55 to a voltage which is greater than the reference voltage, and, (2) an above limit condition results in a positive voltage, or voltage rise, at conductor 62 with a low output current, lower than the reference current, through resistor 60 to thus charge capacitor 55 to a voltage which is smaller than the reference voltage.

As a result of the above-described condition, capacitor 59 is cyclically charged to the polarity indicated, and then discharged to provide a negative square wave at input terminal 65 of Schmitt trigger 62 so long as a below limit condition exists. An above limit condition results in a positive square wave at input terminal 65. Schmitt trigger 62 is responsive only to the negative square wave and cycles between its stable and unstable states in reponse thereto.

Considering Schmitt trigger 62 in detail, transistor 63 is maintained in a nonconducting condition by virtue of a cut-off bias developed at resistor 120 whose upper terminal is connected to a D.C. source of voltage, including capacitor 90. Transistor 64 on the other hand is maintained conductive by a bias circuit which can be traced from ground connection 122 through the input electrodes of the transistor and through resistors 123 and 124 to a conductor 126 which is connected to the negative input terminal 98 of the source of D.C. voltage 89.

The output circuit of transistor 64 can be traced from the grounded terminal 122 through the output electrodes of this transistor and through resistor 66 to terminal 97, conductor 99, and switch 77–74 of relay 71 to negative terminal 98 of source 89. The current flow through this circuit develops a voltage across load resistor 66 such that the upper terminal of this resistor is positive with respect to the lower terminal and this voltage is applied to the input electrodes of transistor 67 as a forward bias to render this transistor conductive. The output circuit of transistor 67 can be traced from ground terminal 127 through the primary of transformer 69, capacitor 68, the output electrodes of transistor 67, resistor 128, terminal 97, conductor 99, and switch 77–74 of relay 71 to the negative terminal 98 of source 89. In this fashion, capacitor 68 is charged to the polarity indicated on the single figure.

Thus far, I have considered only the stable state of operation of Schmitt trigger 62. If a negative input pulse is applied to terminal 65, Schmitt trigger 62 is switched from its stable to its unstable state of operation. In its unstable state of operation, transistor 63 is rendered conducive. Conduction of transistor 63 causes a voltage drop to exist across resistor 124 such that transistor 64 is now biased to be nonconductive. As a result, a forward driving voltage is no longer developed across resistor 66 and transistor 67 is rendered nonconductive.

With transistor 67 nonconductive, charged capacitor 68 is connected to the output electrodes of transistor 70 and discharges through the output electrodes of this transistor. This discharging of capacitor 68 results from a forward bias which is applied to the input electrodes of transistor 70 when transistor 64 is rendered nonconductive, causing the collector electrode of transistor 64 to become more negative and then applying a negative pulse to the base electrode of transistor 70 as a turn-on bias.

In this fashion, so long as negative input pulses (or a negative square wave) are applied to the input terminal 65 of Schmitt trigger 62, capacitor 68 is alternately charged and discharged and relay winding 72 is cyclically energized and maintained in an actuated condition wherein switch blade 74 of this relay engages contact 77.

In the event that a high limit temperature condition is reached, the voltage rise output from thermocouple terminal 13 to terminal 14 increases to the point where a positive input voltage is developed across resistor 58, rendering the right-hand terminal of this resistor positive and, in the manner above described, causing positive voltage pulses to be applied to the input terminal 65 of Schmitt trigger 62. This polarity input signal to Schmitt trigger 62 is not effective to switch the trigger to its unstable condition. Thus, relay 71 drops out, opening its switch 74–77 and closing its switch 74–76 as well as its switch 75–78.

Switch 75–78 is effective to perform a limit output function. Switch 74–76 is effective to energize a red indicator light 200, this light being connected through limit reset switch 94 to the D.C. voltage source 89. Thus, energization of indicator light 200 indicates that a high limit condition has been reached. Energization of the green indicator light 201 is an indication that the apparatus is operating at a below high limit condition.

From the above description it can be seen that my invention is constructed and arranged such that a single bridge network 15 cooperates with a single thermocouple to provide both an indication and a high limit control function, and that, by means of a push-to-set switch 101, my meter indication circuit can be utilized to selectively indicate the control point temperature setting of my high limit apparatus. Furthermore, continuous cycling of my high limit arrangement between two states of operation is necessary in order for the output means 71 to indicate the absence of a high limit condition. Failure to any of the components of my apparatus, causing interruption of this cycling, causes a safe failure, a safe failure being defined as a failure which indicates the presence of a high limit condition.

Other embodiments of my invention will be apparent to those skilled in the art and thus it is intended that the scope of my invention be limited solely by the scope of the appended claims.

I claim as my invention:

1. Thermocouple high temperature limit sensing apparatus comprising;
    a thermocouple adapted to be subjected to a temperature, the high limit of which is to be sensed,
    a source of D.C. voltage, the voltage magnitude of said source determining the high limit control point temperature,
    means including circuit means interconnecting said thermocouple and said source of voltage to provide a voltage of a first polarity when the temperature is below the high limit control point temperature and of an opposite polarity when the temperature is above the high limit control point temperature,
    a trigger circuit having input means and a stable state of operation from which it may be triggered to an unstable state of operation upon a voltage of said first polarity being applied thereto,
    cycling switch means,
    circuit means connecting the voltage of said first named means through said cycling switch means to the input of said trigger circuit to apply a cycling voltage of said first polarity thereto to cause said trigger circuit to cycle between said stable and said unstable states of operation when the temperature is below the high limit control point temperature,
    and means controlled by said trigger circuit and responsive only to cycling thereof.

2. Thermocouple high limit temperature sensing apparatus, comprising;
    a thermocouple having a junction adapted to be subjected to a temperature condition, the high limit of which is to be sensed,
    a source of D.C. voltage,
    circuit means connecting the output of said thermocouple in polarity opposition to said source of voltage to provide a voltage of a first polarity and of a magnitude which decreases as the high limit temperature is approached,
    cycling switch means,
    a trigger circuit having input means and having a stable state and an unstable state, said trigger circuit switching to said unstable state upon a voltage of said first polarity being applied to said input means, circuit means connecting said first named circuit means through said cycling switch means to the input means of said trigger circuit to cause said trigger circuit to cycle between said stable state and said unstable state so long as the temperature condition is below the high limit, means connected to be controlled only by cycling of said trigger circuit, voltage means of a second polarity opposite to said first polarity, and high impedance means connecting said voltage means through said cycling switch means to the input means of said trigger circuit to interrupt cycling of said trigger circuit upon malfunction of said thermocouple.

3. A thermocouple temperature indication and high limit apparatus, comprising;

a thermocouple having a reference junction and a sensing junction which is adapted to be subjected to a temperature condition, the magnitude of which is to be indicated, and the high limit of which is to be sensed, said thermocouple having an output voltage of a first polarity when said sensing junction is at a temperature above the temperature of said reference junction, a bridge circuit, including a source of D.C. bridge energizing voltage, and including a first output voltage of said first polarity and a second output voltage of an opposite polarity, temperature indication means having an input connected to said first output of said bridge circuit and to said thermocouple to indicate the temperature of said sensing junction, high limit means having an input and responsive only to an input voltage of said opposite polarity to provide an output, and means connecting the input of said high limit means to said second output of said bridge circuit and to said thermocouple to cause interruption of the output of said high limit means upon the occurrence of a high limit condition.

4. High limit condition sensing apparatus, comprising;

condition sensing means having means adapted to be subjected to a variable condition, the high limit of which is to be sensed, said condition sensing means being constructed and arranged to provide an output signal of a first sense so long as the variable condition is below a high limit, and to provide an output signal of a second sense when the variable condition is above the high limit, signal responsive trigger means having an input, having a stable condition of operation, and having an unstable condition of operation to which said trigger means is triggered upon a signal of said first sense being applied to the input thereof, cyclic signal interrupting means, means including said cyclic signal interrupting means connecting the output signal of said condition sensing means to the input of said trigger means to cause said trigger means to cycle between said stable and said unstable conditions of operation so long as the variable condition is below the high limit, and means controlled by said trigger means to provide an output indicative of a high limit condition upon failure of said trigger means to cycle.

5. Thermocouple high limit temperature sensing apparatus for use to sense the presence of a high limit temperature condition, comprising;

temperature sensing means including a thermocouple having a sensing junction adapted to be subjected to the temperature condition, said temperature sensing means being constructed and arranged to provide an output signal of a first sense so long as the condition is below the high limit and to provide an output signal of a second sense so long as the temperature condition is above the high limit, signal amplifier means having an input and an output, cycling switch means connected to said amplifier means to chop the input and the output of said amplifier means, means connecting said temperature sensing means to the input of said amplifier means to cause a cyclic voltage of said first sense to appear at the output thereof so long as the temperature condition is below the high limit, trigger means having an input, having a stable state of operation, and having an unstable state of operation, said trigger means being constructed and arranged to switch to said unstable state of operation upon the presence of a signal of said first sense at the input thereof, means connecting the output of said amplifier means to the input of said trigger means to cause said trigger means to cycle between its two states of operation so long as the temperature condition is below the high limit, output means connected to be controlled by said trigger means and responsive only to continued cycling thereof, bias means constructed and arranged to provide an output signal of said second sense, and high impedance means connecting said bias means to the input of said amplifier means to be effective upon malfunction of said temperature sensing means to cause said trigger means to remain in said stable state.

6. A thermocouple temperature indication and high limit temperature sensing apparatus, comprising;

a thermocouple having a reference junction and a sensing junction, said sensing junction being adapted to be subjected to a variable temperature condition, said thermocouple having an output which is a voltage rise when said sensing junction is at a temperature above the temperature of said reference junction, a bridge circuit including a source of D.C. voltage having a first output which is a voltage rise of a fixed magnitude, and having a second output which is a voltage drop of a variable magnitude, said variable magnitude being indicative of the high limit temperature to be sensed, cyclically operable switch means, temperature indication amplifier means having an input and output, means connecting said switch means to the input and output of said temperature indication amplifier means, means connecting said thermocouple in series with the first output of said bridge circuit to the input of said temperature indication amplifier means, temperature indication means, means connecting said temperature indication means to the output of said temperature indication amplifier means, high limit amplifier means having an input and an output, means connecting said switch means to the input and output of said high limit amplifier means, means connecting said thermocouple in series with the second output of said bridge circuit to the input of said limit amplifier means to cause the output thereof to consist of cyclic voltage drop signals when the temperature of said sensing junction is below the high limit and to consist of cyclic voltage rise signals when the temperature of said sensing junction is above the high limit, monostable trigger means having an input and an output and constructed and arranged to have a stable condition of operation and to be sensitive only to a voltage drop input signal to switch to an unstable condition of operation, means connecting the input of said trigger means to the output of said high limit amplifier means, and means connected to the output of said trigger means and constructed and arranged to be responsive only to cycling of said trigger means between said stable and said unstable conditions of operation.

7. A thermocouple temperature indication and high limit sensing apparatus, comprising;

a thermocouple having a sensing junction adapted to be subjected to a temperature condition, a temperature indication amplifier and a high limit amplifier, cycling switch means connected to the input and output circuits of each of said amplifiers to chop the input and output signals thereof, a bridge circuit having a fixed output and a variable output, first means connecting the output of said thermocouple in series with said fixed bridge output to the input of said indication amplifier, a meter connected to the output of said indication amplifier, second means connecting the output of said thermocouple in series with said variable bridge output to the input of said high limit amplifier;

and manual switch means operable when actuated to render said first and second means inoperable and to connect said variable bridge output to the input of said indication amplifier to indicate on said meter the high limit temperature as determined by the magnitude of said variable output.

8. A thermocouple high limit temperature sensing apparatus, comprising;

a thermocouple having a sensing junction and a reference junction, the output of said thermocouple being of a first polarity when said sensing junction is at a temperature above that of said reference junction, a source of voltage of an opposite polarity, the magnitude of said source determining the high limit temperature to be sensed, trigger means having an input and an output, and having a stable state and an unstable state to which said trigger means is triggered upon the presence of a signal voltage of said opposite polarity at the input thereof, means including cycling switch means connecting said thermocouple in series opposition with said source of voltage to the input of said trigger means to cause said trigger means to cycle between said stable and said unstable states so long as a below high limit temperature exists at said sensing junction, output means including electrical energy storage means connected to be cyclically charged and discharged so long as said trigger means continues to cycle, and means responsive only to continuous charge and discharge of said energy storage means.

References Cited by the Examiner
UNITED STATES PATENTS

| | | |
|---|---|---|
| 2,759,150 | 8/1956 | Rosenbaum. |
| 2,832,947 | 4/1958 | Patchell et al. _____ 340—228 X |
| 2,877,650 | 3/1959 | Koletsky _____ 73—359 X |
| 3,150,294 | 9/1964 | Dastidar _____ 340—228 X |
| 3,184,729 | 5/1965 | Freedman et al. _____ 340—248 |

LOUIS R. PRINCE, *Primary Examiner.*

S. H. BAZERMAN, *Assistant Examiner.*